Feb. 9, 1932. H. E. SLOAN ET AL 1,844,445
CHUCK
Filed June 27, 1930
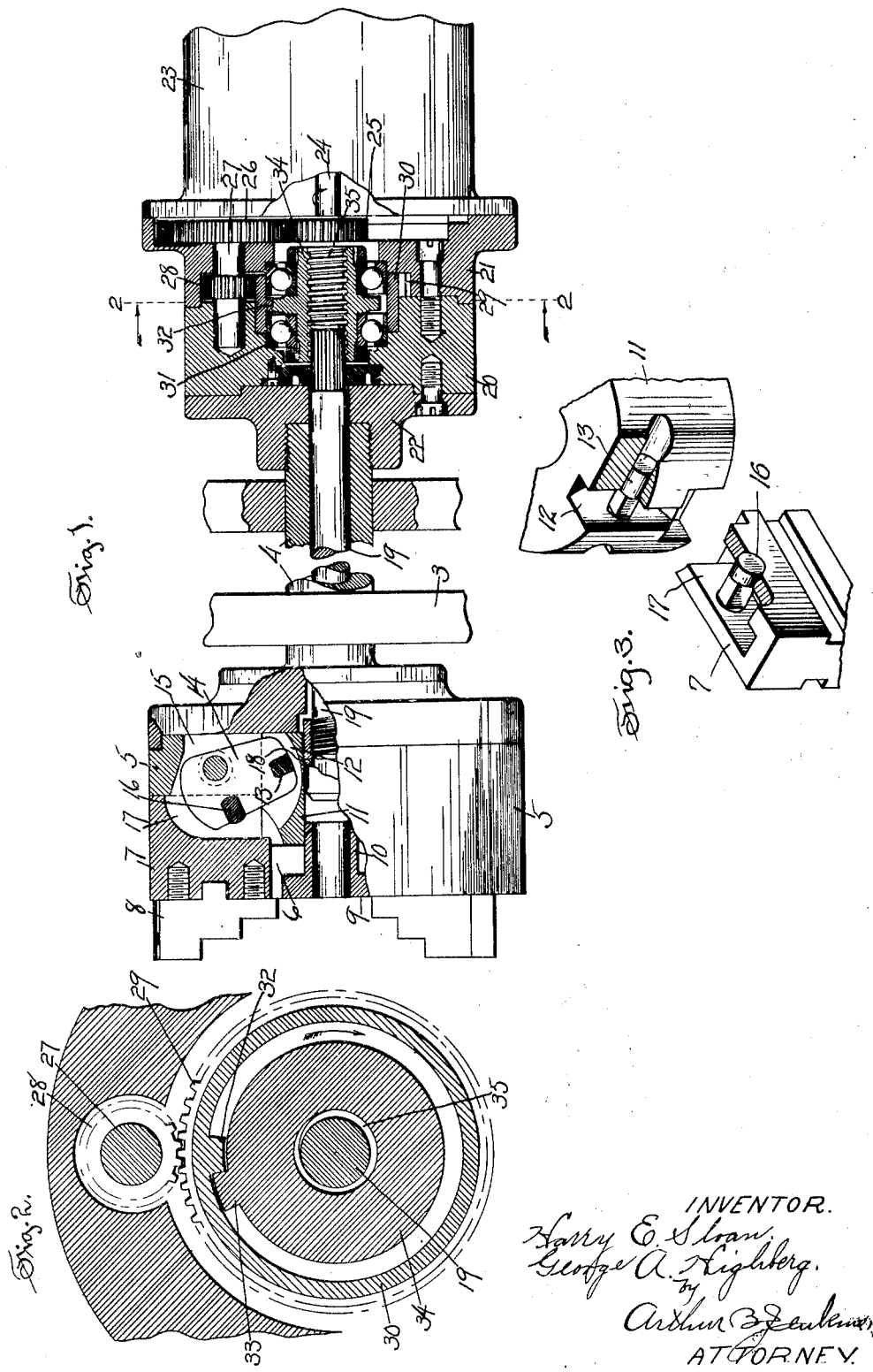
INVENTOR.
Harry E. Sloan,
George A. Highberg.
by
Arthur B. Jenkins
ATTORNEY.

Patented Feb. 9, 1932

1,844,445

UNITED STATES PATENT OFFICE

HARRY E. SLOAN, OF HARTFORD, AND GEORGE A. HIGHBERG, OF WEST HARTFORD, CONNECTICUT, ASSIGNORS TO THE CUSHMAN CHUCK COMPANY, OF HARTFORD, CONNECTICUT, A CORPORATION OF CONNECTICUT

CHUCK

Application filed June 27, 1930. Serial No. 464,241.

Our invention relates to mechanism for opening and closing the chuck jaws or other devices for holding work for various purposes, as for the performance of operations thereon, and an object of our invention, among others, is to provide operating means of this type that shall be simple in construction and particularly efficient in operation.

One form of a chuck embodying our invention, and in the construction and use of which the objects herein set out, as well as others, may be attained, is illustrated in the accompanying drawings, in which—

Figure 1 is a view in side elevation of a portion of a chuck and of our improved driving mechanism connected therewith, the center portions of the chuck driving mechanism being broken out, and parts being broken away in section to show construction.

Figure 2 is a view in section on a plane denoted by the dotted line 2—2 of Figure 1, the scale of this figure being enlarged.

Figure 3 is an isometric view of a fragment of the actuating collar and a chuck jaw associated therewith, and illustrating the mounting of the bars connecting said members with the actuating lever.

In the accompanying drawings the numeral 3 denotes supports for the chuck driving mechanism, which supports may be of any usual and ordinary construction and which comprise bearings for a chuck driving shaft 4 which is tubular and to which driving members, as pulleys, (not shown), may be secured in a manner common to structures of this class. A chuck or other work holding body is secured to the front end of the shaft 4, the particular type of structure herein shown being in the form of a chuck comprising a body 5 formed with radial grooves 6 for the reception of the bases 7 of chuck jaws 8, which jaws are secured to the bases as by means of screws. An opening extending inwardly at the center of the body 5 may be closed by a plate 9 having a stem 10 projecting inwardly therefrom, said stem forming a bearing for one end of an actuating collar 11 slidably mounted in the body, said collar having grooves 12, there being one of these grooves appurtenant to each chuck jaw, and each groove having an actuating bar 13 extending thereacross, each bar being engaged in a notch in the end of a jaw actuating lever 14 pivotally mounted in a recess 15 in the body 5. The upper edge of each lever has a notch to receive a bar 16 projecting across a groove 17 formed in the under side of a base 7 of a chuck jaw.

From this construction it will be seen that a lengthwise movement of the actuating collar 11 will impart a radial movement to the chuck jaws, and our improved mechanism illustrated and described herein is employed for imparting this movement to said collar. A sleeve 18 is screw threadedly engaged with the collar 11 and an actuating spindle 19 projects through the shaft 4 into a chamber in a housing for the actuating mechanism, this housing comprising two sections 20—21 chambered to receive the actuating members. Said spindle 19 is screw threadedly engaged within the hole in the sleeve 18.

A cap 22 secured to the section 20 closes the chamber at one end and the opposite end of said chamber is closed by the base of a motor 23. The shaft 24 of the motor has a pinion 25 meshing with a gear 26 secured to a spindle 27 rotatably mounted in the sections 20—21 of the housing, said spindle having a pinion 28 secured thereto and meshing with a peripheral row of teeth 29 formed on a ring 30. This ring is rotatably mounted within the chamber in the housing.

A tooth 32 is formed on the inner side of the ring 30, said tooth operating against a tooth 33 projecting from the outer side of a spindle actuating sleeve 34 rotatably supported by ball bearing members 31 arranged in any suitable manner. Said sleeve is internally screw threaded, which screw thread meshes with a thread 35 on the spindle 19.

It will be noted that the train of gearing connecting the motor shaft 24 with the spindle actuating sleeve 34 is such as to reduce the speed of the motor to limits suitable for actuation of the spindle 19.

In order to enable the motor to acquire proper speed for efficient operation of the mechanism we provide the teeth 32—33 as a means for imparting rotation of the ring 30 to the sleeve 34. In the structure herein shown one tooth only appears on each of the members 30 and 34. This arrangement of teeth need not, however, necessarily be adhered to. The parts being in the position shown in the figures, the jaws 8 are closed and ready to be moved radially outward. The motor being started the tooth 32 is moved away from the tooth 33 making nearly a complete rotation when it comes in contact with the tooth 33 on the opposite side from that shown in Figure 2. This imparts a blow to the tooth 33 and the sleeve 34 thereby imparting extra force to the jaws to open them should they have a tendency to cling to the work.

During this movement of the tooth 32 from the position shown and to engage the tooth 33 on the opposite side from that shown in Figure 2, the motor has opportunity to gain its full speed and before any substantial resistance is interposed to its movement.

While a chuck with radially moving jaws has been selected by us for the purpose of disclosing our invention herein, it will be understood that the invention may be embodied in other structures for holding articles or devices for operations thereon without departure from the spirit or intent of the invention.

In accordance with the provisions of the patent statutes we have described the principles of operation of our invention together with the device which we now consider to represent the best embodiment thereof; but we desire to have it understood that the device shown is only illustrative, and that the invention may be carried out by other means and applied to uses other than those above set out.

We claim:

1. An actuating mechanism for work holding members, said mechanism including a rotating driving shaft, a work holding body secured to one end of said shaft, a motor secured to the opposite end of said shaft, a holding member movably mounted on said body, an actuating spindle projecting through said shaft and operatively connected with said member to operate it, a rotatably mounted operating member for imparting reciprocating movement to said spindle, a connection between said spindle and operating member to effect longitudinal reciprocating movement of the latter and an operative connection between said operating member and said motor for operation of said operating member.

2. An actuating mechanism for work holding members, said mechanism including a rotating driving shaft, a work holding body secured to one end of said shaft, a motor secured to the opposite end of said shaft, a holding member movably mounted on said body, an actuating spindle projecting through said shaft and operatively connected with said member to operate it, said spindle having a screw threaded end, an operating member rotatably mounted and engaged with the screw threaded end of said spindle, and an operative connection between said operating member and said motor for rotating said operating member.

3. An actuating mechanism for working holding members, said mechanism including a rotating driving shaft, a work holding body secured to one end of said shaft, a housing for operating mechanism secured to the opposite end of the shaft, a motor secured to said housing, a holding member mounted on said body, an actuating spindle projecting through said shaft and operatively connected with said holding member to operate it, said spindle having a screw threaded end, an operating member rotatably mounted in said housing and engaged with the screw threaded end of said spindle, and an operative connection between said operating member and motor for rotation of said operating member.

4. An actuating mechanism for work holding members, said mechanism including a reciprocating member, a work holding body having a holding member movable thereon, an operative connection between said holding member and reciprocating member for operation of the holding member, a motor including a rotating driving member, and an operative connection between said motor and reciprocating member including means for translating the rotation of said driving member into reciprocating movement of said reciprocating member.

5. An actuating mechanism for work holding members, said mechanism including a reciprocating member having a screw-threaded end, a work holding body having a holding member movable thereon, an operative connection between said holding member and reciprocating member for operation of the former, an actuating member rotatably mounted and engaged with the screw threaded end of said reciprocating member, a motor, and an operative connection between said motor and said actuating member to rotate the latter.

6. An actuating mechanism for work holding members, said mechanism including a work holding body, a holding member movably mounted thereon, a motor and an operative connection between said holding member and motor, said connection including two members one of which is operatively connected with the motor and the other of which is operatively connected with said holding member, and connecting means between said two members to permit a limited movement of the member connected with the motor independently of the other member before simultaneous operation of both members.

7. An actuating mechanism for work holding members, said mechanism including a work holding body, a holding member movably mounted thereon, a motor, and an operative connection between said holding member and motor, said connection including two rotatably mounted members, one of which is operatively connected with the motor and the other of which is operatively connected with said holding member, and connecting means between said two members to permit a limited rotating movement of the member connected with the motor independently of the other member before operative engagement and simultaneous rotation of both of said members.

8. A chuck jaw actuating mechanism including a chuck, a jaw movably mounted thereon, a motor, and an operative connection between said jaw and motor, said connection including two rotatably mounted members one of which is operatively connected with the motor, the other of which is operatively connected with said jaw, and a tooth projecting from each of said members into the path of movement one of the other whereby limited rotation of one toothed member connected with the motor is permitted independently of the other toothed member.

9. A chuck jaw actuating mechanism including a chuck, a jaw movably mounted thereon, a motor, an operative connection between said jaw and motor, said connection including a rotatably mounted member operatively connected with said jaw and having a tooth projecting therefrom, a ring rotatably mounted and having a single tooth projecting to engage the tooth on said rotatably mounted member, and an operative connection between said motor and said ring.

HARRY E. SLOAN.
GEORGE A. HIGHBERG.